United States Patent Office 3,493,254
Patented Feb. 3, 1970

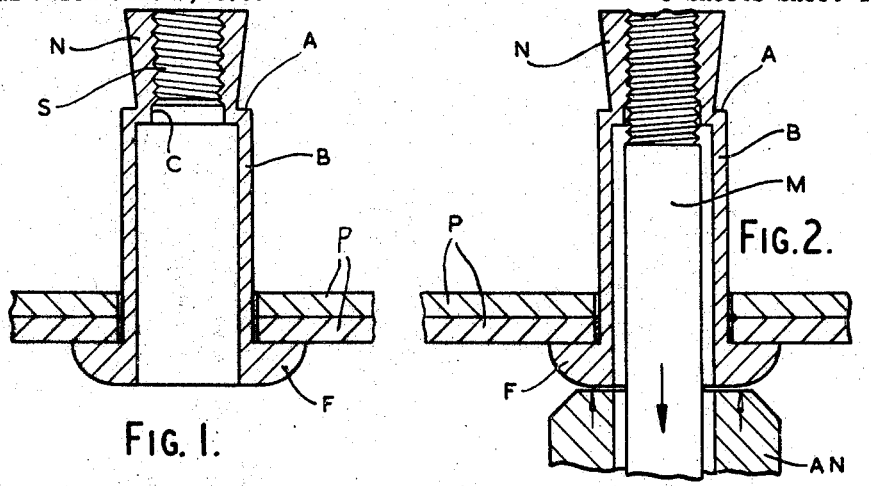
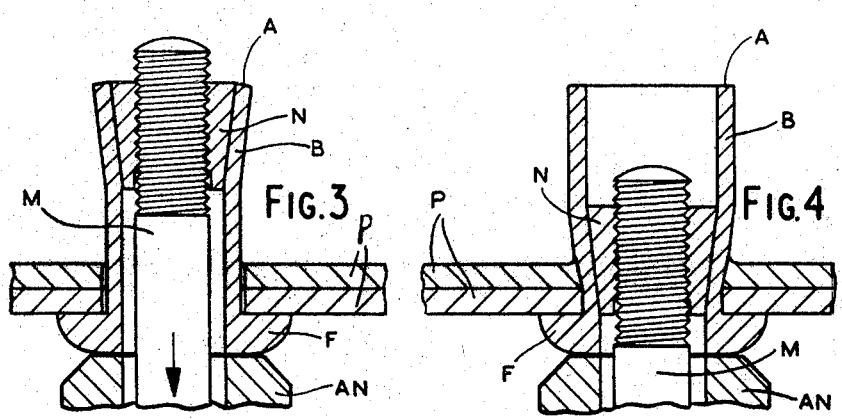
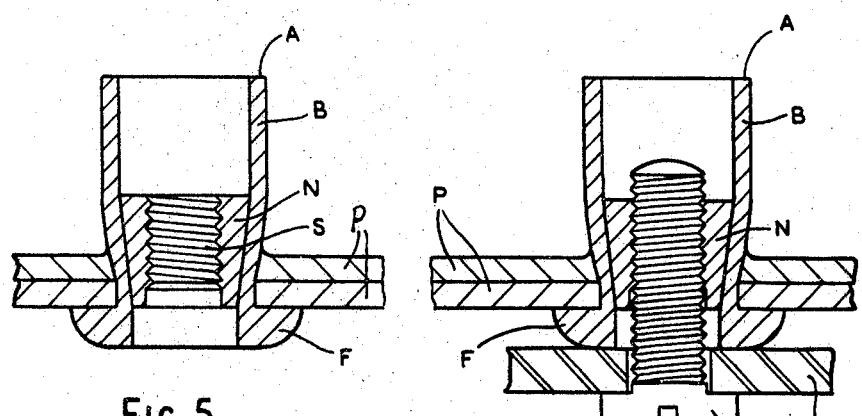

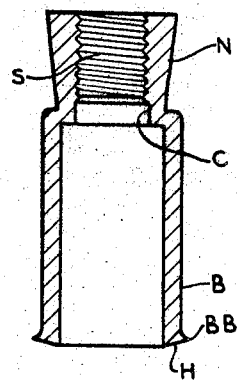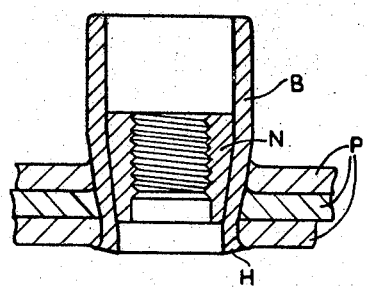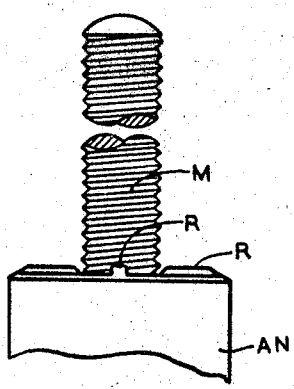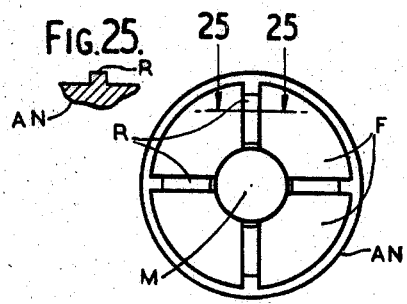
FIG.22.  FIG.23.  FIG.25.  FIG.24.  FIG.26.

3,493,254
ONE-PIECE ANCHOR FASTENING DEVICE AND JOINT THEREWITH
Frederick Arthur Summerlin, Harpenden, and Harvey Philip Jeal, Stevenage, England, assignors, by mesne assignments, to Aerpat A.G., Zug, Switzerland, a corporation of Switzerland
Continuation of application Ser. No. 461,678, June 7, 1965. This application Sept. 5, 1967, Ser. No. 665,946
Claims priority, application Great Britain, June 5, 1964, 23,447/64
Int. Cl. F16b 1/00, 3/00, 5/00, 7/00
U.S. Cl. 287—189.36                                  4 Claims

ABSTRACT OF THE DISCLOSURE

An anchor nut fastener device in combination with at least one relatively thin, apertured sheet or other workpiece wherein the fastener device has an internally screw threaded nut portion formed integrally with a coaxial tubular body portion. The external surface of the nut portion converges at least from a point intermediate its ends toward one end of the body portion which it meets at the inner boundary of an annular external end face of the body portion. With this arrangement, when sufficient axial compression is exerted between the nut and body portions by means of a screw threaded mandrel passed through the body portion and screwed into the nut portion, the material of the device is sheared at the junction of the nut portion with the body portion and the nut portion is drawn into the body portion where is expands the latter radially into firm gripping engagement with the sheets or other workpieces and the nut itself becomes firmly wedged within the body portion.

---

This application is a continuation of copending application Ser. No. 461,678 filed June 7, 1965, now abandoned.

This invention relates to blind hole fasteners of the kind comprising tubular members adapted to be secured by deformation of the material thereof in an aperture in a single sheet or other workpiece, or in a plurality of aligned apertures in a plurality of sheets, to fasten them together, and present an internal screw thread within said aperture(s) for effecting screw attachments to said sheet(s).

A blind hole anchor nut fastener device, according to the invention, has an internally screw-threaded nut portion formed integrally with a co-axial tubular body portion and the external surface of this nut portion converges at least from a point intermediately of its length towards one end of the body portion which it meets at the inner boundary of an annular external end face of the latter; the arrangement being such that when sufficient axial compression is exerted between the nut and body portions by means of a screw-threaded mandrel passes through the body portion and screwed into the nut portion, the material of the device is sheared at the junction of the nut portion with the body portion and the nut portion is drawn, wedge-like, into the body portion and expands the latter radially into firm grip with the sheet(s) or other workpiece(s) and itself becomes firmly wedged within said body portion.

The screw-threaded mandrel may be slidable longitudinally in an axial bore in a holder, or anvil member, of a placing tool or gun of known type, which presents an abutment or anvil face to the free end of the body during the placing.

Preferably, the nut portion terminates internally of the device a short distance further from the free end of the nut portion than does its tapering surface externally of the device, and the internal diameter of the nut portion is smaller than that of the body portion leaving an internal annular face presented towards the free end of the body portion and located a short distance further from the outer end of the nut portion than the annular external end face at the inner boundary of which the smaller end of the tapering external surface of the nut portion meets the end of the body portion.

Preferably also, the screw thread of the nut portion terminates short of the inner or smaller end of said portion, the remaining interior surface of the nut portion at that end of said portion being frusto-conically divergent towards the body portion and/or cylindrical.

The invention is illustrated by the accompanying diagrammatic drawings of which:

FIGURES 1 to 6 show in axial section one form of wastener device in accordance with the invention which has a head at the free end of the body portion and how it is placed in aligned openings in two contiguous plates;

FIGURE 22 shows in axial section a further form of device according to the invention;

FIGURE 23 shows this device after placing;

Figure 28:
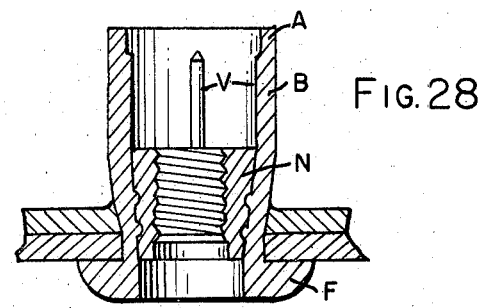
Figure 27:
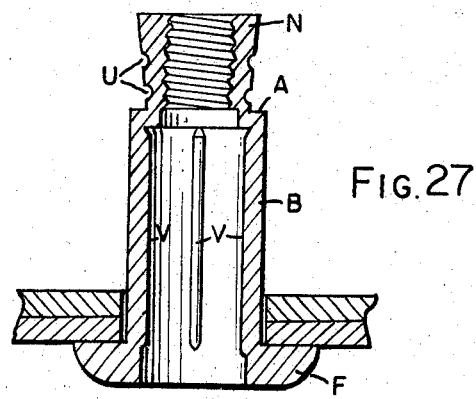

FIGURES 24 to 26 show the tool used to effect the placing, FIGURE 25 being a fragmentary view in cross-section on the line 25—25 of FIGURE 26; and FIGURES 27 and 28 are patterned after FIGURES 1 and 5 and show an alternative embodiment.

Throughout the drawings, the body and nut portions of the fastener are indicated at B and N, respectively, the internal screw thread of the nut portion N is indicated at S, and a screw-threaded mandrel is indicated at M.

Referring first to FIGURES 1 to 6 of the drawings; in this example the body portion B is formed integrally with a substantial head or flange F at its free end, and a plain internal surface C of cylindrical shape extends between the inner end of the nut member N and the internal screw thread S of the latter. The external surface of the nut portion N is frusto-conical and tapers from the free end of said portion to meet an external flat annular end face A of the body portion B at the inner boundary of said face A where the external diameter of the device is at a minimum which is equal to or a little less than the internal diameter of the body portion B whose internal and external diameters are the same throughout its length.

In FIGURE 1 the fastener is placed through aligned openings in two contiguous plates, indicated at P, to be secured together with a firmly fixed anchor nut fastener device extending through them.

In FIGURE 2 a screw-threaded mandrel M has been inserted through the body portion B and screwed into the nut portion N. This mandrel M protrudes from an axial bore in an anvil member AN, which together with the mandrel M may be part of a placing tool or gun of known type.

In FIGURE 3 the material of the fastener has been sheared where the nut portion N joins the body portion B and the nut member N has been drawn by the mandrel into the upper end of the body portion B expanding it as shown.

In FIGURE 4 the nut portion N has been drawn into the body portion B as far as the head F, and has expanded its head end to the tapering configuration shown in which it has deformed the rear plate to a greater extent than the front plate and so effectively has clamped the plates P against the head F.

In FIGURE 5 the screwed mandrel M and associated anvil member AN have been removed and, in FIGURE 6 a headed screw H is screwed into the nut portion N to secure a plate or other member L detachably to the plates P.

The fastener shown in FIGURES 7 to 12 of the drawings is the same as that shown in FIGURES 1 to 6 except that the body portion B is formed without a head or flange.

Figure 7:
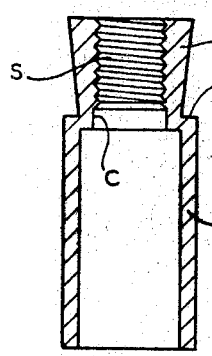
FIGURES 7 to 12 show similarly one headless form of fastener according to the invention.
Figure 8:
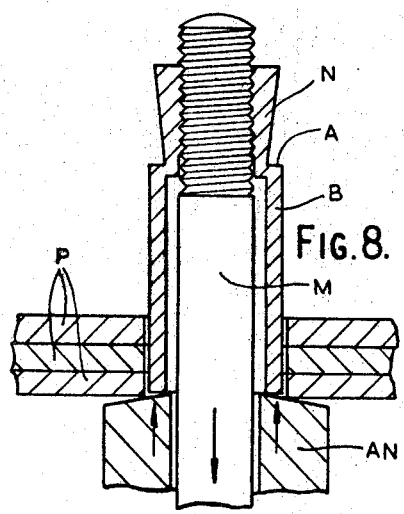

In FIGURE 8 a screw-threaded mandrel M has been inserted through the body portion B and screwed into the nut portion N and the fastener is, so to speak, gripped axially between the threaded end of the mandrel M and the end face of an anvil member AN which in this case is of shallow frusto-conical configuration instead of quite flat as in the case of FIGURES 1–6.

Figure 9:
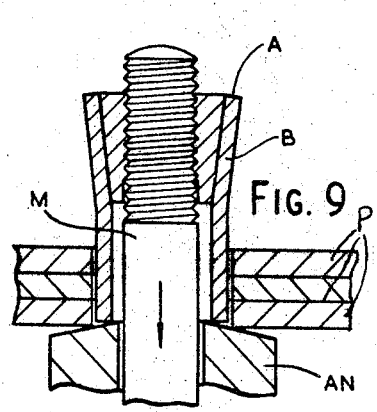

In FIGURE 9, with the anvil member AN held firmly against the face of the lower sheet P by the operator, the mandrel M has sheared the junction between the nut and body portions N and B and pulled the former into the upper end of the latter.

Figure 10:
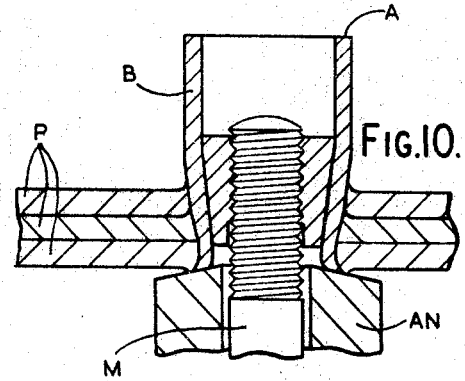

In FIGURE 10, with the frusto-conical face of the anvil member AN still held against the lower sheet P, the nut portion N has been pulled downwardly to within a short distance of the lower end of the body portion B which, under the influence of the frusto-conical shape of the face of the anvil AN, has been curled outwardly so that the body portion is locked to the plates P against axial movement upwardly as well as downwardly.

Figure 11:
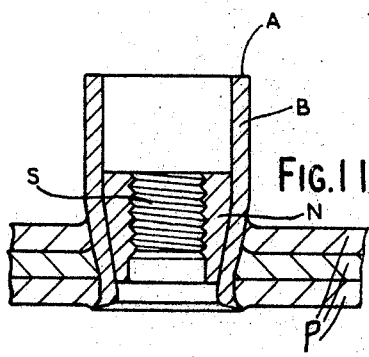
Figure 12:
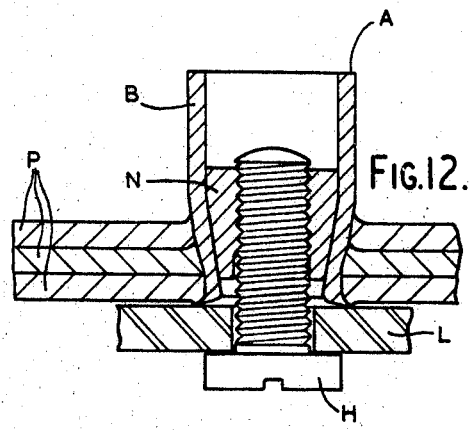

In FIGURE 11, the mandrel M and anvil AN have been removed, and in FIGURE 12 a headed screw H is screwed into the nut portion N to receive a plate or other member L detachably to the plates P.

Referring now to FIGURES 13 to 18 of the drawings; here an anvil member AN has its face formed with six raised radial ribs R, R. With this arrangement the downward movement of the mandrel M can be continued until, as shown in minimum sheet thickness, the lower end of the body portion B and also the lower end of the nut portion N meet the face of the anvil member AN, first at the ribs R, R, and subsequently at the spaces between said ribs, to have material thereof displaced outwardly to serve virtually as a head holding the body portion B positively against upward movement through the plates P. In the case of sheets of substantially greater thickness than those shown in FIGURES 13 to 18 the nut portion will not come into contact with the anvil member AN and only the body portion B will be outwardly displaced.

Figure 17:
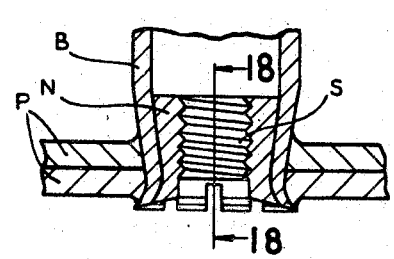
Figure 14:
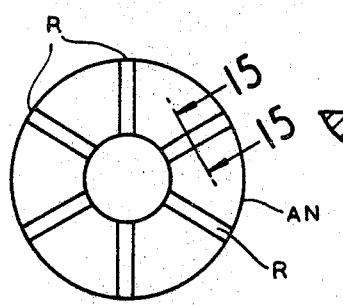
Figure 15:
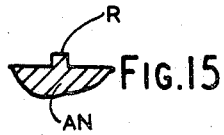
Figure 18:
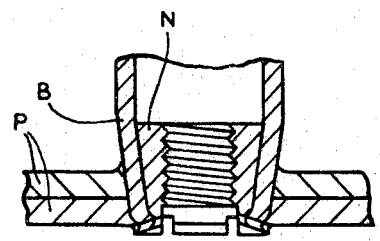
Figure 16:
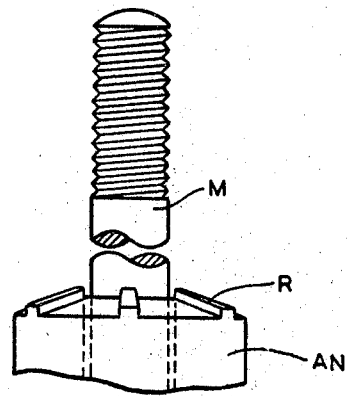

FIGURE 14 is a plan view of the radially ribbed frusto-conical working face of the anvil member AN, FIGURE 15 is a fragmentary sectional view on the line 15—15 of FIGURE 14 which shows one of the ribs R in cross-section, and FIGURE 16 is a side view of the upper end portions of the threaded mandrel M and the anvil member AN. FIGURE 17 shows in diametral section how the material of the nut and body portions N and B and the plates P is displaced at these regions between the ribs R, R, and FIGURE 18 shows in section on the line 18—18 of FIGURE 17 the form produced directly above the ribs R, R.

It can be shown mathematically that under the torque applied by a screw (provided of course the head of the screw does not bear on the end of the fastener) neither the nut nor body of the fastener can ever turn with the screw.

Figures 19, 20:
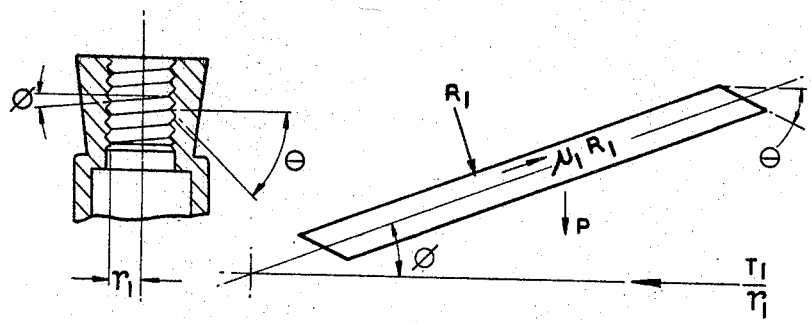
FIGURE 19 is a fragmentary view of the nut portion only of a typical fastener device according to the invention.
FIGURE 20 shows the thread of the nut unwound.
Figure 21:
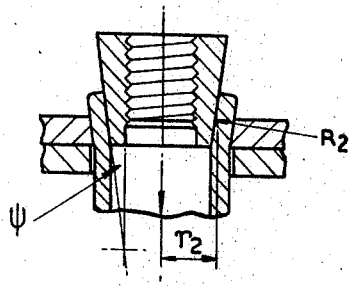
FIGURE 21 is a fragmentary view of the tubular body portion and the nut portion after the latter has been sheared off.

Referring to FIGURES 19 to 21:
$\phi$ is the helix angle of the thread in the nut;
$\theta$ is half the included angle of the thread; and
$r_1$ is the effective thread radius.

When a screw is fitted to this nut, assuming that there is no interference between nut and screw, the torque applied to the nut (which is of course equal and opposite to the torque applied to the screw) will depend on the tension induced in the screw H, the helix angle of nut $\phi$, the half thread angle of nut $\theta$, and the coefficient of friction $\mu_1$, between nut and screw.

This expression can be established if we consider the forces existing between screw and nut. FIGUGRE 20 shows the thread of the nut unwound so that it appears as an inclined plane. Acting on this plane the torque applied to the bolt appears as a horizontal force $T_1/r_1$ where $T_1$ is the applied torque and $R_1$ is normal reaction between the mating threads on screw and nut. P is the tension force applied to the nut acting along the screw axis.

Resolving these forces into the bolt axis we obtain:

$$P = R_1 \cos \theta \cos \phi - \mu_1 R_1 \sin \phi$$

and resolving into the plane of $T_1/r_1$:

$$\frac{T_1}{r_1} = \mu_1 R_1 \cos \phi + R_1 \cos \theta \cdot \sin \phi$$

Substituting $$R_1 = \frac{P}{\cos \theta \cdot \cos \phi - \mu_1 \sin \phi}$$

we obtain:

$$\frac{T_1}{T_1} = \frac{P(\mu_1 \cos \phi + \cos \theta \cdot \sin \phi)}{\cos \theta \cdot \cos \phi - \mu_1 \sin \phi}$$

or:

$$T_1 = P r_1 \left( \frac{\mu_1 \cos \phi + \cos \theta \cdot \sin \phi}{\cos \theta \cos \phi - \mu_1 \sin \phi} \right) \quad (1)$$

If we now consider the forces acting on the nut we have the axial force $P_1$ and the reaction $R_2$ between the tapered wall of the nut, the body of the fastener supported by the sheet. $\psi$ is half the taper angle and $\mu_2$ the coefficient of friction between nut and fastener body. Assume the tangential force which will just spin the nut is $T_2/r_2$ then we may write:

$$\frac{T_2}{r_2} = \mu_2 \cdot R_2$$

Now $P = R_2 \sin \psi$
i.e.

$$\frac{T_2}{r_2} = \mu_2 \frac{P}{\sin \psi} \quad (2)$$

The nut will therefore never spin as the screw is tightened provided:

$$T_2 > T_1$$

i.e. substituting from (1) and (2)

$$\frac{r_2 \mu_2}{\sin 4} > r_1 \left( \frac{\mu_1 \cos \phi + \cos \theta \cdot \sin \phi}{\cos \theta \cos \phi - \mu_1 \sin \phi} \right) \quad (3)$$

It is also necessary to consider the possibility of the body of the fastener spinning in the hole in the sheet before the nut spins in the body but this is obviously unlikely since the coefficient of frictions are not likely to be different, the axial force and taper angles are substantially the same, and the radius of action of the frictional force is greater.

If we evaluate Equation 3 for any of the standard threads in common use it is found that the angle $\psi$ can be of the order of 30°–40° before the nut will spin.

In practice the included angle of the frusto-conical surface of the nut portion N is in the region of 5°–10°. The reasons for this are fairly simple:

(1) The placed fastener must not fall apart when the screw is put in. Therefore $\psi$ must be small to retain the nut against normal screw insertion loads trying to push it out.

(2) In the analysis it was assumed that there was no interference between screw and nut. In practice dirt, burrs and thread errors can all contribute to make the thread "tight."

Figure 13:
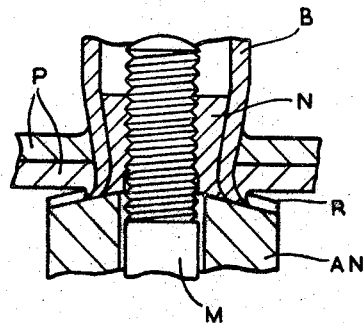
FIGURES 13 to 18 are fragmentary views showing the deformation of the free end of the body portion and of the nut portion therein, which is obtained by the use of a different abutment or anvil member during the placing.

The blind hole anchor nut fastener device shown in FIGURES 22 and 23 is similar to that of FIGURES 7 to 12 and that of FIGURES 13, 17 and 18. It differs, however, in that it has around its free end a circumferential "burr" BB which together with said end constitutes in effect a very small countersunk head H having an angle of the order of 45° at its underside and a much smaller angle of the order of 20° at its annular front face.

FIGURE 23 shows this device after placing in aligned apertures in three plates, P, P, P, by means of a tool comprising a screw-threaded mandrel M and anvil AN similar to those of FIGURE 16, except that in this case the screw threaded mandrel M does not move axially. To place the fastener, the mandrel M is rotated so as to screw into the nut N and draw the nut into the body B. The mandrel can then be removed by reversing its direction of rotation. As shown in FIGURES 24 to 26, however, the anvil AN has a flat, instead of a conical, end face F which has only four radial ribs R, which are helped to bite into the free end of the body portion B to prevent it from turning with the mandrel M during the placing operation by the shaping and relatively sharp inner edge of the annular free end face of the body portion B. In addition to the burr or very small head H, the device of FIGURE 22 has a rounded external shoulder at the upper end of the body portion B.

It will be apparent that the working face of the anvil member AN used for placing may be formed in other ways than those shown to assist the outward movement thereover of material to lock the wedged body and nut portions positively against axial displacement.

In some cases the internal surface of the body portion and/or the external surface of the nut portion may be serrated or otherwise formed for mutual engagement to prevent rotation of the nut within the body. The retention of the nut in the body in resisting axial forces can be substantially improved if a plurality of annular grooves (three appear to be sufficient) approximately .005" deep and .015" wide are machined in the tapered surface. Also, if desired, the external surface of the body portion may be formed similarly to engage the material of the plate(s) or other workpiece(s) within the opening(s) through which it extends the better to resist rotation therein. FIGURES 27 and 28 illustrate the foregoing alternative embodiments with the annular grooves U in the nut portion N and with axially extending ribs V on the interior of the body portion B.

From the above description, it will be understood by those familiar in this art that by this invention there is provided a blind hole anchor nut fastener device by which the above-mentioned objectives are fully realised. Since other forms of the invention than those described and illustrated herein are possible, it is to be distinctly understood that the foregoing description is illustrative only, not limiting.

We claim:

1. A one piece anchor fastening device in combination with at least one apertured workpiece for anchoring an internally threaded portion of said device in said aperture comprising:
    an internally screw threaded nut portion;
    a tubular body portion coaxial and integral with said nut portion received in said aperture in relatively close fit therewith, extending axially therefrom and having substantially uniform cross section throughout its length except for a portion of increased diameter defining an enlarged head portion at its end remote from the nut, said body portion having an axial extent substantially at least as great as said nut portion, said head portion engaging one side of said workpiece with the opposite end thereof projecting beyond the other side of said workpiece;
    means defining a radially inwardly extending shoulder on said body portion at the juncture of said nut and body portions, the exterior surface of said nut portion converging at least from a point intermediate its length toward the junction with said body portion to define a substantially frustoconical configuration and terminating at said shoulder in an outer diameter substantially equal to the internal diameter of said body portion, the maximum diameter of said frustoconical configuration defining the maximum transverse dimension of said nut, said shoulder defining the minimum cross sectional area of said device to provide a section weak in axial shear at the junction of said nut and body portions, the external diameter of said nut portion and the internal diameter of said body portion being so dimensionally related that said nut portion may be drawn entirely within said body portion and retained therein solely by friction;
    outside surfaces of the entire fastener being at every cross section, cylindrical and the inside surfaces cylindrical and non-entrant;
    whereby when sufficient axial compression is exerted between said nut and body portions by means of a screw threaded mandrel passed through said body portion and screwed into said nut portion, the material of the device is sheared cleanly at said shoulder to separate said body and nut portions prior to any substantial change in the cross section of said body portion, and said nut portion is thereafter drawn into said body portion a distance depending upon the thickness of the workpiece or workpieces, to expand said body portion uniformly radially outwardly into firm gripping engagement with the inner surfaces of the openings in the workpiece or workpieces and the nut portion is thereafter retained in the body portion at a position at least partially within the openings in the workpiece or workpieces solely by friction between said two portions resulting from the converging external surface of said nut portion wedging into the interior of said body portion.

2. A blind hole anchor nut fastener device as claimed in claim 1, wherein said body portion around its end remote from said nut portion includes a circumferential burr which together with said end constitutes in effect a very small countersink head.

3. A blind hole anchor nut fastener device as claimed in claim 1, wherein the internal surface of said body portion and/or the external surface of said nut portion is formed with serrations or the like for mutual engagement to prevent rotation of the nut within the body.

4. A blind hole anchor nut fastener device as claimed in claim 1, wherein the external surface of the nut portion is formed with at least one annular groove.

References Cited

UNITED STATES PATENTS

| 2,102,230 | 12/1937 | Waterman | 85—72 |
| 2,963,935 | 12/1960 | Shields | 85—72 X |
| 3,089,377 | 5/1963 | Engstrom | 85—72 |
| 3,196,733 | 7/1965 | Cohen et al. | 85—72 |
| 3,216,304 | 11/1965 | James et al. | 85—72 |

FOREIGN PATENTS

| 653,957 | 1/1965 | Belgium. |
| 647,380 | 12/1950 | Great Britain. |

RAMON S. BRITTS, Primary Examiner

U.S. Cl. X.R.

85—72, 74